United States Patent [19]

Funk et al.

[11] 3,819,585

[45] June 25, 1974

[54] POLYESTER ESTERIFICATION UNDER TWO DIFFERENT PRESSURES

[75] Inventors: Paul M. Funk, Decatur; Billy J. Legg; Richard W. Baldwin, both of Athens, all of Ala.

[73] Assignee: Monsanto Company, St. Louis, Mo.

[22] Filed: Jan. 26, 1973

[21] Appl. No.: 326,935

Related U.S. Application Data

[63] Continuation-in-part of Ser. No. 185,010, Sept. 30, 1971, abandoned.

[52] U.S. Cl.............................. 260/75 M, 260/475 P
[51] Int. Cl.............................................. C08g 17/01
[58] Field of Search.................................. 260/75 M

[56] References Cited
UNITED STATES PATENTS
3,185,668    5/1965    Meyer et al........................... 260/75

*Primary Examiner*—Melvin Goldstein

[57] ABSTRACT

In the process for continuous production of highly polymeric synthetic linear polyester polymers, where ethylene glycol and terephthalic acid are reacted to form bis(beta hydroxy) ethyl terephthalate and low molecular weight polymer and thereafter subjected to polycondensation — the improvement is provided wherein a first phase of esterification is conducted at about 0–5 psig (0–0.35 kg/cm$^2$ gauge) pressure through about 75–95% of esterification; during which water is easily removed, as is a substantial amount of ethylene glycol; and a second phase conducted at a pressure substantially higher than the first phase during which percent of esterification is increased to about 95–99%.

10 Claims, 1 Drawing Figure

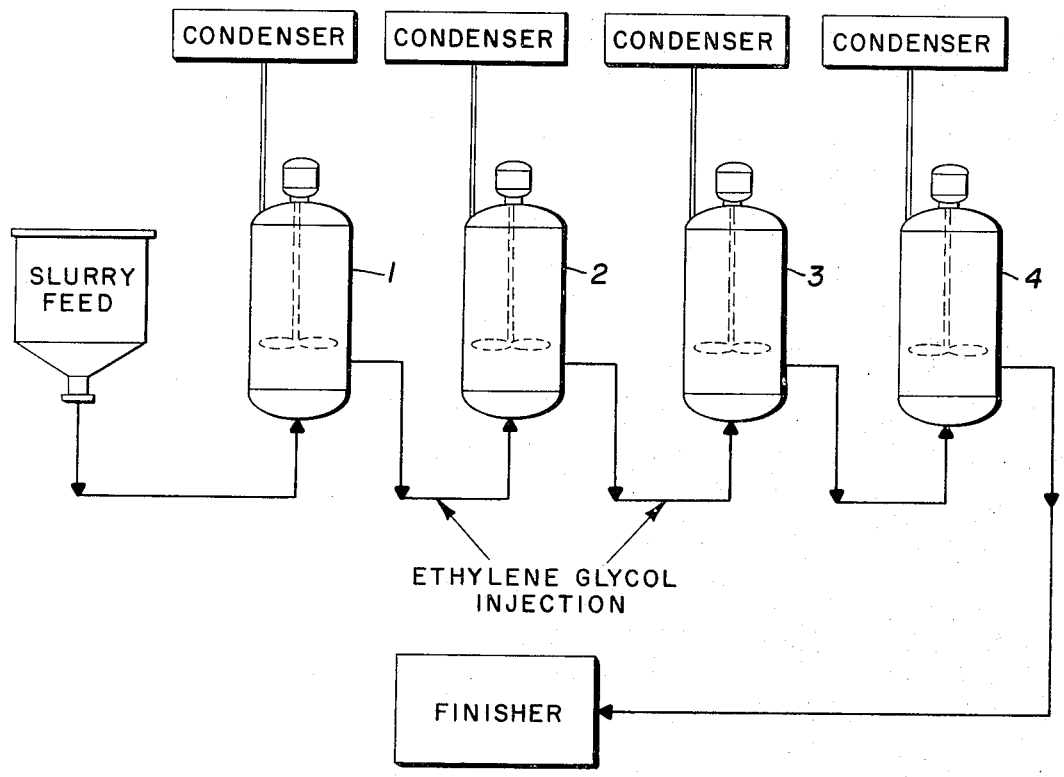

POLYESTER ESTERIFICATION UNDER TWO DIFFERENT PRESSURES

BACKGROUND OF THE INVENTION

This is a continuation-in-part application of our copending application Ser. No. 185,010, filed Sept. 30, 1971 and now abandoned.

This invention relates to polyesters produced by condensation reactions of polyethylene glycols and dicarboxylic acids or reactive derivatives thereof.

It is well known that the polymeric polyesters prepared by the condensation of a glycol or its functional derivatives and a dicarboxylic acid or a polyester forming derivative thereof such as an acid halide, a salt, or a simple ester of a dibasic acid and volatile monohydric alcohol are excellent fiber-forming polymers. Commercially, highly polymeric polyesters are prepared, for example, by the condensation of terephthalic acid or dimethyl terephthalate and a polymethylene glycol containing from about 2–10 carbon atoms, and particularly ethylene glycol. These polyesters are relatively insoluble, chemically inactive, hydrophobic materials capable of being formed into filaments which can be cold-drawn to produce textile fibers of superior strength and pliability.

In the direct esterification process for the manufacture of high molecular weight linear polyester, it is well known, for example, that terephthalic acid may be heated with an excess of ethylene glycol to form the di-glycol ester and low polymer thereof which can then be polymerized by heating in the presence of a catalyst under reduced pressures to form a high molecular weight product. The esterification is normally accomplished in two distinct reaction zones. In the first reaction zone, terephthalic acid and ethylene glycol are reacted to yield a pre-polymer product having a 50–95% esterification. This product is then reacted in a second zone where essentially complete esterification is accomplished by the introduction of additional ethylene glycol. The second zone reaction product is characterized by a 95–99.9% esterification of the carboxyl end groups present.

After the esterification is substantially completed, the prepolymer is introduced into a third and/or fourth reaction zone where polymerization consisting essentially of trans-esterification takes place, producing polymers as for staple end use, for example, of a molecular weight range of 17,500–18,500.

Typical prior art operating conditions for a three or four stage polyester process using an excess of ethylene glycol in the first stage would include a first stage reaction zone characterized by atmospheric or super-atmospheric pressures and temperatures ranging from 220° to 300°C.; a second stage reaction zone with atmospheric or sub-atmospheric pressures (or below the ethylene glycol vapor pressures), and somewhat higher temperatures than the first reaction zone, e.g., 250°–300°C.; and a third and possibly fourth reaction zone involving high vacuums and still higher temperatures ranging from about 275°C. to 310°C.

To a greater or lesser extent, and depending upon the ratio of ethylene glycol or terephthalic acid employed, and at various points during the direct esterification polymerization process, it is, of course, necessary to remove water which is a by-product of the reaction of the acid and the glycol, as well as any excess of glycol.

Although there is no clear-cut point at which esterification ceases and trans-esterification commences, since there may be some esterification taking place in the so-called "trans-esterification phase", and some trans-esterification taking place during the so-called "esterification phase", most of the water and glycol is ordinarily removed during that portion of the reaction in which esterification primarily occurs, or in the first and second zones described above.

It is also known that the introduction of an excess of glycol late in the esterification reaction facilitates substantial completion of esterification. For this reason, a sweep of ethylene glycol will often be introduced into a vessel containing a prepolymer substantially esterified, at the top of which vessel the excess of glycol is removed by distillation.

It is an object of this invention to provide a method for more efficient production of polyethylene terephthalate pre-polymers.

It is another object of this invention to provide a method for the production of low carboxyl prepolymers of polyethylene terephthalate.

The objects of this invention are accomplished by employing a two-phase esterification system wherein from about 75–95% esterification takes place in the pressure range of about 0–5 psig; and up to about 99% esterification takes place at a pressure range higher than the first phase.

To further understand this invention, reference will be made to the attached drawing which forms a part of the present application, in which the figure is a flow sheet illustrating a preferred embodiment of this invention.

Referring now in detail to the figure, a slurry of terephthalic acid and excess of ethylene glycol (along with a conventional esterification catalyst such as antimony, arsenic, titanium, tin or bismuth) is fed into heated reactor 1 continuously. In heated reactor 1, the glycol and acid, in the presence of low molecular weight polymer and bis(beta hydroxy) ethyl terephthalate (BHET), are agitated at about 225°–285°C. and a low pressure of 0–5 psig (0–0.35 kg/cm$^2$ gauge). The water released during esterification is vaporized; and vapors of water and ethylene glycol are removed to the condenser. The low molecular weight polymer at a degree of esterification of about 75–95%, is fed into esterification vessel 2 with an optionally additional amount of ethylene glycol. In esterification vessel 2, pressure is at least 5 psi (.35 kg/cm$^2$ gauge) higher, preferably 20–40 psig (1.40–2.80 kg/cm$^2$ gauge); and the temperature is 250°–300°C.

The polymer may then be fed, with additional ethylene glycol, into reactors 3 and 4 at pressures of about 60–760 mm Hg and 10–150 mm Hg respectively and, at temperatures of about 260°–300°C., in which the completion of esterification accompanies an increase in the intrinsic viscosity. The ethylene glycol injection provides an excess of glycol in order to accomplish substantial completion of esterification reaction. Glycol is distilled off in each condenser, and may be recovered in a manner well known in the art. It may or may not be recycled, as desired. I have discovered that by utilizing a low pressure; then relatively high pressure in a process comprising 2 or more phases, a pre-polymer may be obtained which is low in diethylene glycol content, this being the advantage of the first low pressure phase; and low, as well, in carboxyl content, this being the result of the second or higher pressure phase.

After emerging from esterification vessel 4, the polymer stream is fed to a finisher wherein, under vacuum and agitation, the polymerization reaction is completed at a degree of polymerization of at least about 80, in an amount to be determined by end usage requirements.

Basis: 1 hour operation
where:
$x$=feed rate carboxyl equivalents of terephthalic acid/hr./lb. polymer
$y$=output rate carboxyl equivalents of terephthalic acid/hr./lb. polymer Reaction conditions in the example were as follows:

TABLE I

| Vessels | Reactor 1 | Esterifier Transfer Line | Esterifier O'Heads Vapor Line | Reactor 2 | EG Inj. Ea. | Reactor 3 | Reactor 4 |
|---|---|---|---|---|---|---|---|
| Process Temperature °C | 249 | Inlet 249 Outlet 271 | Inlet 249 Outlet 264 | 280 | Inlet Amb. Outlet 280 | 280 | 280 |
| Dow Temperature °C | 257 | 280 | 280 | — | As Req'd | 297 | — |
| Pressure | 2 | — | — | 30 | 150 psig | 150 mm | 50 mm |
| Holdup lbs/lb. spun/hr. | 12.58 | — | — | .47 | — | .50 | .46 |
| IV | .103 | — | — | — | — | — | .170 |
| Carboxyl | 629 | — | — | — | — | — | 71 |
| DEG Mole % | 1.07 | — | — | 1.50 | — | — | 1.75 |

.90 lbs. TA/lb. polymer spun/hur.
.47 lbs. EG/lb. polymer spun/hr.
plus catalyst The invention is further illustrated by the following example in which the process is carried according to the flow sheet shown in the drawing. All parts and percentages are on a weight basis less otherwise indicated.

EXAMPLE

The slurry was 396 pounds/hour consisting of terephthalate acid—0.90, ethylene glycol—0.47 and antimony—$128 \times 10^{-6}$ (pounds/pound net) in the form of antimony glycollate. The contents of the first reactor was maintained under a pressure of 2 psig (0.14 kg/cm² gauge), and a temperature of 249°C.; in reactor 2 contents were maintained under a pressure of 30 psig (2.10 kg/cm² gauge) and 280°C. In reactors 3 and 4 the contents were maintained under a pressure of 150 and 50 millimeters mercury respectively, and both reactors at a temperature of 280°C. In reactors 2 and 3 ethylene glycol injection, 0.051 pounds of ethylene glycol, per pound net was used. The product of reactor 4 had a carboxyl concentration of 71, a mole percent concentration of diethylene glycol of 1.75, and an intrinsic viscosity ($\eta$) of 0.170.

The determination of the concentration of carboxyl groups is made by dissolving polymer samples in 2.6 dimethyl phenol and chloroform under reflux and titrating with ethanolic potassium hydroxide to a bromothymol blue end point. Content of diethylene glycol is determined by saponification of polyethylene terephthalate with potassium hydroxide to form dipotassium terephthalate from which terephthalic acid content is determined by measurement of the base consumed in the saponification. Ethylene glycol content is determined by oxidation with metaperiodate followed by acidametric titration; and diethylene glycol is determined by oxidation with dichromate, and spectrophotometric determination of excess dichromate. These methods are well known in the art.

In a continuous process, degree of esterification in a given vessel may be determined by measuring carboxyl concentration of a bottoms sample, and applying it as follows:

% DEG of Esterification $=([x-y]/x)\,100$

Percentage of esterification, measured as described above, was 94.1. Intrinsic viscosity ($\eta$) was calculated from specific viscosity ($\eta sp$) at a measured concentration (at 0.5g of the polymeric product in 100 ml of a solvent having a molar ratio: 2 phenol/1 trichlorophenol) in accordance with the following equation: $\eta = (\sqrt{2/c})[\eta sp - \ln \eta rel]^{1/2}$, where $\eta rel = 1 + \eta sp$, $c$ is the concentration of the polymer in grams per 100 milliliter of solvent, and $\ln \eta rel$ is the natural logarithm of the relative viscosity of the dilute polymer solution, as is well known in the art.

The glycol injection may or may not be employed depending upon the specification of the final product. A lowering of carboxyl concentration will result if glycol injection is used or the injection rate is increased.

While certain represetive embodiments and details have been shown for the purpose of illustrating the invention, it will be apparent to those skilled in the art that there are changes and modifications which may be made therein without departing from the spirit or scope of the invention. The number of esterification vessels in the series can be increased or decreased depending upon the exact properties desired. Using only three vessels, in a process otherwise identical in the example, a typical product will be characterized by a carboxyl concentration of 120, a diethylene glycol mole percent concentration of 2.0, and an intrinsic viscosity of 0.175.

We claim:

1. A process for the continuous production of high molecular weight synthetic linear polyester polymers comprising subjecting terephthalic acid and an excess of ethylene glycol in a first phase to a pressure of about 0–5 psig (0–0.35 kg/cm² gauge), and a temperature of about 225°–285°C., until completion of about 75–95% of esterification; thereafter subjecting the resulting low molecular weight polymer and bis(beta hydroxy) ethyl terephthalate in a second phase to a pressure substantially higher than first phase pressure and a temperature of about 250°–300°C., until completion of about 95–99% of esterification; and polymerizing by transesterification said low molecular weight polyester to form a high molecular weight linear polyester to a degree of polymerization of at least about 80.

2. The process of claim 1 wherein said first phase of esterification is conducted at about 2 psig (0.14 kg/cm² gauge) and 250°C.

3. The process of claim 1 wherein the second phase of esterification is conducted at at least 5 psi (0.35 kg/cm²) above the pressure of the first phase.

4. The process of claim 1 wherein the second phase of esterification is conducted at 20–40 psig (1.40–2.80 kg/cm² gauge) and about 280°C.

5. The process of claim 1 wherein additional phases of esterification are conducted at 50–150 millimeters mercury and a temperature of about 280°C.

6. In the process for continuous production of highly polymeric synthetic linear polyester polymers consisting of at least 85% by weight of an ester of a dihydric alcohol and terephthalic acid, the improvement comprising subjecting terephthalic acid and excess of ethylene glycol in a first phase to a pressure of about 0–5 psig (0–0.35 kg/cm² gauge), and a temperature of about 225°–275°C., until completion of about 75–95% of esterification; thereafter subjecting the resulting low molecular weight polymer and bis(beta hydroxy) ethyl terephthalic in a second phase to a pressure substantially higher than the first phase pressure and a temperature of about 250°–300°C., until completion of about 95–99% of esterification.

7. The process improvement of claim 6 wherein the first phase of esterification is conducted at about 2 psig (0.14 kg/cm² gauge) and about 250°C.

8. The process improvement of claim 6 wherein the second phase of esterification is conducted at least 5 psi (0.35 kg/cm²) above the pressure of the first phase.

9. The process improvement of claim 6 wherein the second phase of esterification is conducted at 20–40 psig (1.40–2.80 kg/cm² gauge) and about 280°C.

10. The process improvement of claim 6 wherein additional phases of esterification are conducted at 50–150 millimeters mercury and a temperature of about 280°C.

* * * * *